United States Patent
Terashima et al.

(10) Patent No.: US 7,419,311 B2
(45) Date of Patent: Sep. 2, 2008

(54) SURFACE MOUNT OPTICAL COUPLER, METHOD OF MOUNTING THE SAME, AND METHOD OF PRODUCING THE SAME

(75) Inventors: Tokihiro Terashima, Tokyo (JP); Hiroshi Wada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 11/703,771

(22) Filed: Feb. 8, 2007

(65) Prior Publication Data

US 2007/0248301 A1 Oct. 25, 2007

(30) Foreign Application Priority Data

Apr. 21, 2006 (JP) .............................. 2006-117935

(51) Int. Cl.
*G02B 6/36* (2006.01)
(52) U.S. Cl. .............................. 385/88; 385/35; 438/31; 257/E33.001
(58) Field of Classification Search .................. 385/35, 385/88; 438/31; 257/E33.001
See application file for complete search history.

(56) References Cited

U.S. PATENT DOCUMENTS 7,269,317 B2* 9/2007 Blauvelt et al. ............... 385/50

| 2004/0081385 A1* | 4/2004 | Karnacewicz et al. ......... 385/14 |
| 2005/0018974 A1* | 1/2005 | Rolston et al. ................ 385/83 |
| 2007/0036496 A1* | 2/2007 | Gaebe .......................... 385/94 |
| 2007/0072321 A1* | 3/2007 | Sherrer et al. ................. 438/26 |

FOREIGN PATENT DOCUMENTS

| JP | 116941 | 1/1999 |
| JP | 2001-094191 | 4/2001 |
| JP | 2003-344711 | 12/2003 |
| JP | 2005-055475 | 3/2005 |

* cited by examiner

*Primary Examiner*—Ellen Kim
(74) *Attorney, Agent, or Firm*—Kubotera & Associates, LLC

(57) ABSTRACT

A surface mount optical coupler includes a silicon substrate; an optical semiconductor device disposed on an upper surface of the silicon substrate; and a short bare fiber formed of vitreous silica. A V-shaped linear groove is formed in the upper surface of the silicon substrate. The V-shaped groove extends from one end surface of the silicon substrate toward a light emitting surface of the optical semiconductor device in a direction perpendicular to the light emitting surface. Further, the V-shape groove supports the short bare fiber. The short bare fiber has one end surface optically coupled with a light emitting portion of the light emitting surface. The short bare fiber has a length smaller than that of the V-shaped groove.

19 Claims, 9 Drawing Sheets

SURFACE MOUNT OPTICAL COUPLER, METHOD OF MOUNTING THE SAME, AND METHOD OF PRODUCING THE SAME

BACKGROUND OF THE INVENTION AND RELATED ART STATEMENT

The present invention relates to a surface mount optical coupler, a method of mounting the same, and a method of producing the same. More specifically, the present invention relates to a surface mount optical coupler using a silicon substrate.

In a surface mount optical coupler, components such as an optical semiconductor device and an optical part are precisely mounted at specific positions on a silicon substrate through image recognition or mechanical positioning. In a method of mounting an optical semiconductor device and an optical part, an axis adjusting process for adjusting axes thereof to achieve optical coupling is omitted or simplified (refer to Patent References 1 and 2).

With reference to FIGS. 9(A), 9(B), and 10, conventional surface mount optical couplers will be explained. FIGS. 9(A) and 9(B) are views showing a configuration of the conventional surface mount optical coupler. As shown in FIGS. 9(A) and 9(B), the conventional surface mount optical coupler includes an optical semiconductor device 10 and an optical fiber 60 as an optical part.

In a method of producing the conventional surface mount optical coupler, a V-shaped groove 14 is formed in a surface of a silicon substrate 12 through an alkali etching process. The optical semiconductor device 10 (laser diode or photo diode) is precisely mounted at a specific position on the silicon substrate 12 through image recognition or mechanical positioning. A pigtail bare fiber 16 is placed in the V-shaped groove 14 such that a distance between an end surface of the optical fiber 60 and a light emitting surface or a light receiving surface of the optical semiconductor device 10 becomes a proper optical coupling distance, thereby forming the conventional surface mount optical coupler.

Accordingly, in the method of producing the conventional surface mount optical coupler, it is possible to mount the optical semiconductor device 10 and the optical fiber 60 without an axis adjusting process. That is, when a resin layer of the optical fiber 60 at a distal end portion thereof is removed through a bare process of the pigtail bare fiber 16, the distal end portion of the optical fiber 60 becomes a bare optical fiber in a state that a glass portion thereof is exposed.

In general, the pigtail bare fiber 16 has a very small amount of decentration with respect to an outer diameter of a bare fiber and a core center. Accordingly, when the pigtail bare fiber 16 is placed in the V-shaped groove 14, it is possible to precisely position the pigtail bare fiber 16 with respect to the optical semiconductor device 10 mounted precisely (refer to Patent Reference 3).

In the optical fiber 60, a cover cord 18 covering the bare optical fiber is reinforced with a flexible plastic or an ultraviolet setting resin. Accordingly, it is possible to increase strength of the optical fiber 60 and improve handling performance thereof while the base optical fiber is still flexible.

After an intermediate assembly of the conventional surface mount optical coupler is placed in a package 20, the package 20 is air-tightly sealed, thereby obtaining the conventional surface mount optical coupler. In this process, an Au metal portion 22 deposited in advance on the pigtail bare fiber 16 is inserted into a metal pipe 24. Afterward, the metal pipe 24 is sealed with sealing solder 26, and a cover 28 is welded to the package 20.

When the conventional surface mount optical coupler is attached to an electrical circuit board, package leads 30 are connected to the electrical circuit board with solder, so that an excess amount of heat is not conducted to the cover cord 18.

FIG. 10 is a view showing another conventional surface mount optical coupler. The conventional surface mount optical coupler shown in FIG. 10 has a configuration of a collimator lens coupling type. In the conventional surface mount optical coupler, a collimator lens 32 converts divergent light emitted from the optical semiconductor device 10 (laser diode) mounted on the silicon substrate 12 to parallel light. A collective lens 34 converges the parallel light one more time and couples to the pigtail bare fiber 16 (refer to Patent Reference 4).

In the conventional surface mount optical coupler shown in FIG. 10, a space between the collimator lens 32 and the collective lens 34 is used for mounting an isolator and the likes. The pigtail bare fiber 16 is mechanically positioned in the V-shaped groove 14. Further, the collimator lens 32 and the collective lens 34 are mounted in lens mounting V-shaped grooves 36 formed in the silicon substrate 12 without an axis adjusting process. Accordingly, it is possible to significantly simplify the axis adjusting process of the optical part.

Patent Reference 1: Japanese Patent Publication No. 11-6941
Patent Reference 2: Japanese Patent Publication No. 2003-344711
Patent Reference 3: Japanese Patent Publication No. 2005-55475
Patent Reference 4: Japanese Patent Publication No. 2001-94191

In the conventional surface mount optical coupler described above and shown in FIGS. 9(A) and 9(B), when the surface mount optical coupler is placed in the package 20, it is necessary to deposit the Au metal portion 22 on the pigtail bare fiber 16, so that the outlet portion of the optical fiber 60 is sealed with the sealing solder 26. Further, it is necessary to provide the metal pipe 24 in a sidewall of the package 20 for inserting the pigtail bare fiber 16, thereby increasing processing cost.

In the conventional surface mount optical coupler described above and shown in FIGS. 9(A) and 9(B), it may be possible to seal the outlet portion of the optical fiber 60 with a resin, or to use a less expensive plastic package. In this case, however, although it is possible to reduce cost, it is difficult to air-tightly seal the package 20 and to achieve necessary reliability, thereby making it difficult to balance cost and performance.

Further, when the conventional surface mount optical coupler is attached to the electrical circuit board, it is difficult to stably place the package 20 on the electrical circuit board due to a repulsive force of the optical fiber 60. As a result, it is difficult to attach the conventional surface mount optical coupler to the electrical circuit board with solder using a soldering iron.

All of the other electric components are mounted on the electrical circuit board through a reflow process. Accordingly, if it is possible to mount the conventional surface mount optical coupler through the reflow process, it is possible to significantly improve efficiency of the mounting operation.

However, in the reflow process, it is necessary to heat a component up to 230 to 250° C. that exceeds a withstand temperature of the cover cord 18. Further, it is difficult to stably place the conventional surface mount optical coupler on the electrical circuit board. As a result, in general, the conventional surface mount optical coupler is attached to the electrical circuit board with solder using a soldering iron.

In the surface mount optical coupler of the collimator lens coupling type shown in FIG. 10, in order to correct mode mismatching between the laser diode and the optical fiber, it is necessary to convert (image enlargement) a spot image of the laser diode through a lens to a size substantially same as that of the optical fiber. However, it is difficult to completely correct the mode mismatching, thereby lowering coupling efficiency.

Further, in the conventional surface mount optical coupler of the collimator lens coupling type, it is necessary to achieve high angle tolerance between the lenses. Accordingly, it is necessary to mount the laser diode and the lenses with high accuracy. Therefore, when the laser diode and the lenses are mounted without an axis adjusting process, production yield tends to lower.

In view of the problems described above, an object of the present invention is to provide a surface mount optical coupler with low cost and improved reliability. Further, an object of the present invention is to provide a method of mounting the surface mount optical coupler and a method of producing the surface mount optical coupler with improved efficiency.

Further objects and advantages of the invention will be apparent from the following description of the invention.

SUMMARY OF THE INVENTION

In order to attain the objects described above, according to the present invention, a surface mount optical coupler includes a silicon substrate; an optical semiconductor device disposed on an upper surface of the silicon substrate; and a short bare fiber formed of vitreous silica. A V-shaped linear groove is formed in the upper surface of the silicon substrate. The V-shaped groove extends from one end surface of the silicon substrate toward a light emitting surface of the optical semiconductor device in a direction perpendicular to the light emitting surface. Further, the V-shape groove supports the short bare fiber. The short bare fiber has one end surface optically coupled with a light emitting portion of the light emitting surface. The short bare fiber has a length smaller than that of the V-shaped groove.

According to the present invention, a method of producing a surface mount optical coupler enables a reflow process when the surface mount optical coupler is mounted on an electrical circuit board in a state that a short bare fiber is disposed in a V-shaped groove.

More specifically, the method includes the steps of: forming a linear V-shaped groove in an upper surface of a silicon substrate from one side of an area to a middle of the area in which the area is cut from a silicon wafer in a rectangular shape; mounting an optical semiconductor device on the upper surface of the silicon substrate on an extension of the V-shape groove such that a light emitting surface of the optical semiconductor device is aligned in a direction perpendicular to a direction that the V-shape groove extends; placing a short bare fiber formed of vitreous silica having a length smaller than that of the V-shaped groove in the V-shaped groove such that one end surface of the short bare fiber is optically coupled with the light emitting surface of the optical semiconductor device; and sealing the optical semiconductor device and the short bare fiber with a sealing cover.

In the surface mount optical coupler according to the present invention, there is provided the short bare fiber having a length smaller than that of the V-shaped groove formed in the silicon substrate. Further, the short bare fiber is optically coupled with the optical semiconductor device. Accordingly, when a portion of the short bare fiber on a side of the one end surface thereof and the optical semiconductor device are sealed with a sealing cover, a portion of the short bare fiber on a side of the other end surface thereof can protrude from the sealing cover.

As a result, in the present invention, it is possible to optically couple the short bare fiber with the optical semiconductor device through an arbitrary method. Further, it is not necessary to insert a pigtail bare fiber into a metal package for the optical coupling, as opposed to a conventional surface mount optical coupler in which it is necessary to air-tightly seal through solder.

In the present invention, it is possible to mount the surface mount optical coupler air-tightly sealed in advance on a package. Accordingly, it is possible to use a package formed of a resin or a non-metallic material, instead of a metal package, thereby significantly reducing production cost.

In the method of producing the surface mount optical coupler according to the present invention, since a whole portion of the short bare fiber is formed of vitreous silica, the short bare fiber has an extremely high melting temperature and sufficient high temperature resistance with respect to a reflow process. Further, it is possible to stably place the silicon substrate in a state that the short bare fiber is placed in the V-shaped groove. Accordingly, it is possible to mount the surface mount optical coupler through the reflow process together with other electrical components.

Further, in the method of producing the surface mount optical coupler according to the present invention, it is possible to perform and complete a series of the production steps on the silicon substrate such as forming the V-shaped groove in the silicon substrate, mounting the optical semiconductor device, placing the short bare fiber, and sealing the surface mount optical coupler air-tightly. Accordingly, it is possible to automatically produce the surface mount optical coupler in a short period of time with high efficiency, thereby reducing production cost and maintaining stable quality.

DETAILED DESCRIPTION OF PREFERRED EMBODIMENTS

Figure 1:
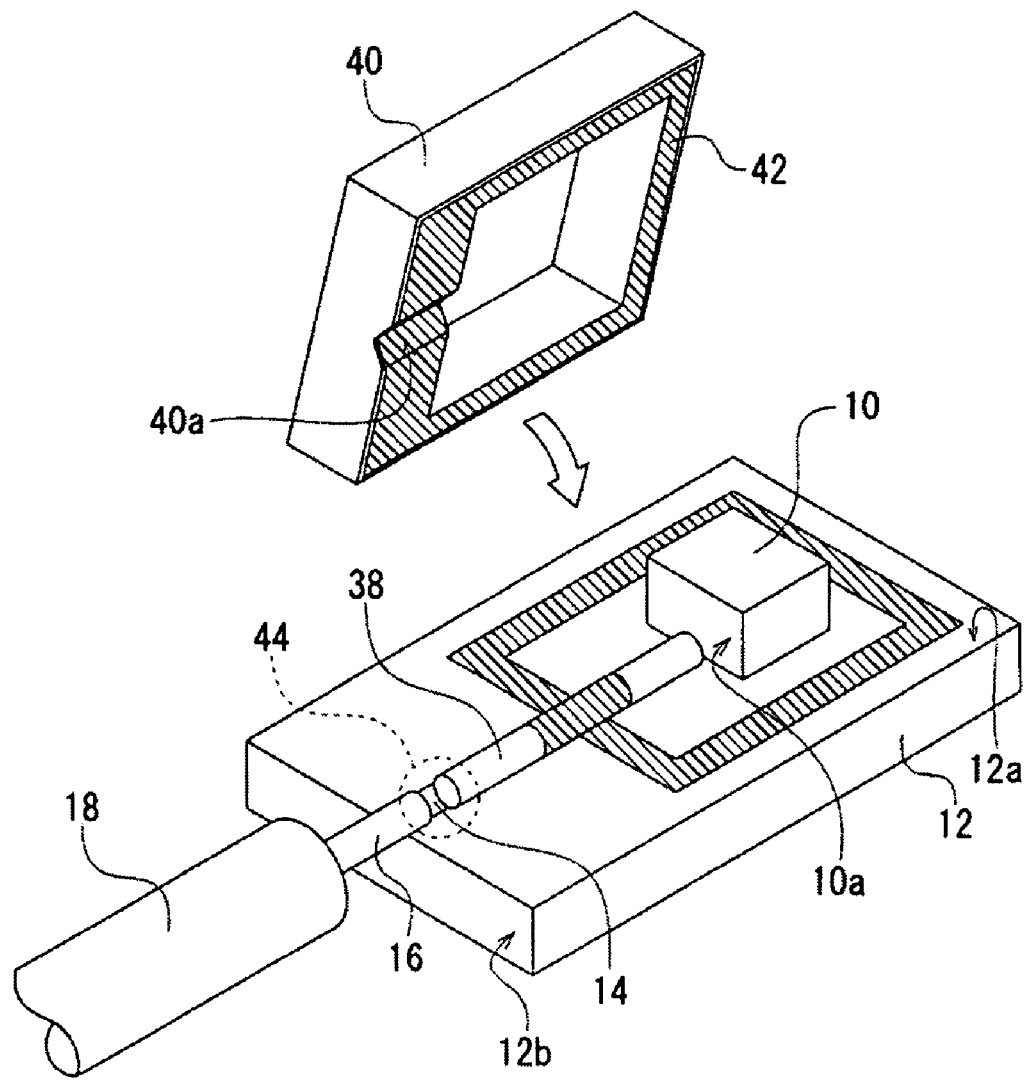
FIG. 1 is a schematic exploded perspective view showing a surface mount optical coupler having a short bare fiber according to a first embodiment of the present invention.

Hereunder, embodiments of the present invention will be explained with reference to the accompanying drawings. The drawings schematically show shapes, sizes, and positional relationships of constituting component, and the invention is not limited to those shown in the drawings. In the drawings, a size, a shape, and an arrangement of the constituting components are schematically shown for explanation of the present invention. Specific materials, conditions, and numerical conditions described in the following description are just examples, and the invention is not limited to those examples.

First Embodiment

A first embodiment of the present invention will be explained. FIG. 1 is a schematic exploded perspective view showing a surface mount optical coupler according to the first embodiment of the present invention.

As shown in FIG. 1, the surface mount optical coupler includes a silicon substrate 12; an optical semiconductor device 10 disposed on the silicon substrate 12; a V-shaped groove 14 with a linear shape formed in the silicon substrate 12; and a short bare fiber 38.

In the embodiment, the optical semiconductor device 10 may include a semiconductor laser and a light reception element. Similar to a conventional mount optical coupler, the optical semiconductor device 10 is mounted on the silicon substrate 12 with high precision.

In the embodiment, the V-shaped groove 14 is formed in an upper surface 12a of the silicon substrate 12. Further, the V-shaped groove 14 extends from one end surface 12b of the silicon substrate 12 toward a light emitting surface 10a of the optical semiconductor device 10 in a direction perpendicular to the light emitting surface 10a.

In the embodiment, the short bare fiber 38 has a length smaller than that of the V-shaped groove 14. Further, the short bare fiber 38 is supported with the V-shaped groove 14 in a state that one end surface of the short bare fiber 38 is optically coupled with a light emitting portion of the light emitting surface 10a.

The short bare fiber 38 will be explained in more detail. After the short bare fiber 38 is placed in the V-shaped groove 14, a sealing cover 40 is placed on the silicon substrate 12, so that the sealing cover 40 pushes the short bare fiber 38 from above. Then, the sealing cover 40 is pressed and thermally fixed to the silicon substrate 12 with solder or low melting point glass 42.

When the sealing cover 40 is fixed to the silicon substrate 12 with the solder 42, it is necessary to deposit Au metal for soldering on outer surfaces of the short bare fiber 38, the silicon substrate 12, and the sealing cover 40. Further, it is necessary to extend an electrode from a backside of the silicon substrate 12 through a via hole, and to provide an insulation layer on an electric wiring pattern for preventing electric short. When the sealing cover 40 is fixed to the silicon substrate 12 with the low melting point glass 42, it is possible to directly connect the short bare fiber 38 to an oxide layer on a surface of the silicon substrate 12.

An outer circumference of the short bare fiber 38 is formed of a vitreous silica cladding to obtain high heat resistance and air-tightness. The one end surface of the short bare fiber 38 facing the light emitting portion of the optical semiconductor device 10 may be formed in a flat shape, an inclined shape, or a round shape, or may be coated with an anti-reflection layer according to optical specification and coupling efficiency with respect to the optical semiconductor device 10.

The other end surface of the short bare fiber 38 is optically coupled with an optical part other than an optical coupler or an optical part outside an optical coupler. In the embodiment shown in FIG. 1, the short bare fiber 38 is directly and optically coupled with a pigtail bare fiber 16 in the V-shaped groove 14. In this case, the pigtail bare fiber 16 is placed in a space in the V-shaped groove 14 between the other end surface of the short bare fiber 38 and the end surface 12b of the silicon substrate 12.

In the embodiment, a reflective index matching member 44 formed of a transparent silicone resin is filled in the optically coupled portion between the short bare fiber 38 and the pigtail bare fiber 16 for reducing a coupling loss and reflection light.

In the embodiment, the surface mount optical coupler includes the sealing cover 40 for air-tightly sealing a portion of the short bare fiber 38 on a side of the other end surface thereof and the optical semiconductor device 10. The sealing cover 40 includes a space for accommodating the optical semiconductor device 10 and a groove 40a for receiving the portion of the short bare fiber 38, so that the short bare fiber 38 extends outside the sealing cover 40. Further, the sealing cover 40 is welded to the upper surface 12a of the silicon substrate 12 with solder, a resin, or a low melting point glass. Accordingly, the portion of the short bare fiber 38 opposite to the light emitting surface 10a extends outside the sealing cover 40, so that the other end surface of the short bare fiber 38 is optically coupled with the pigtail bare fiber 16 outside the sealing cover 40.

Second Embodiment

Figure 2:
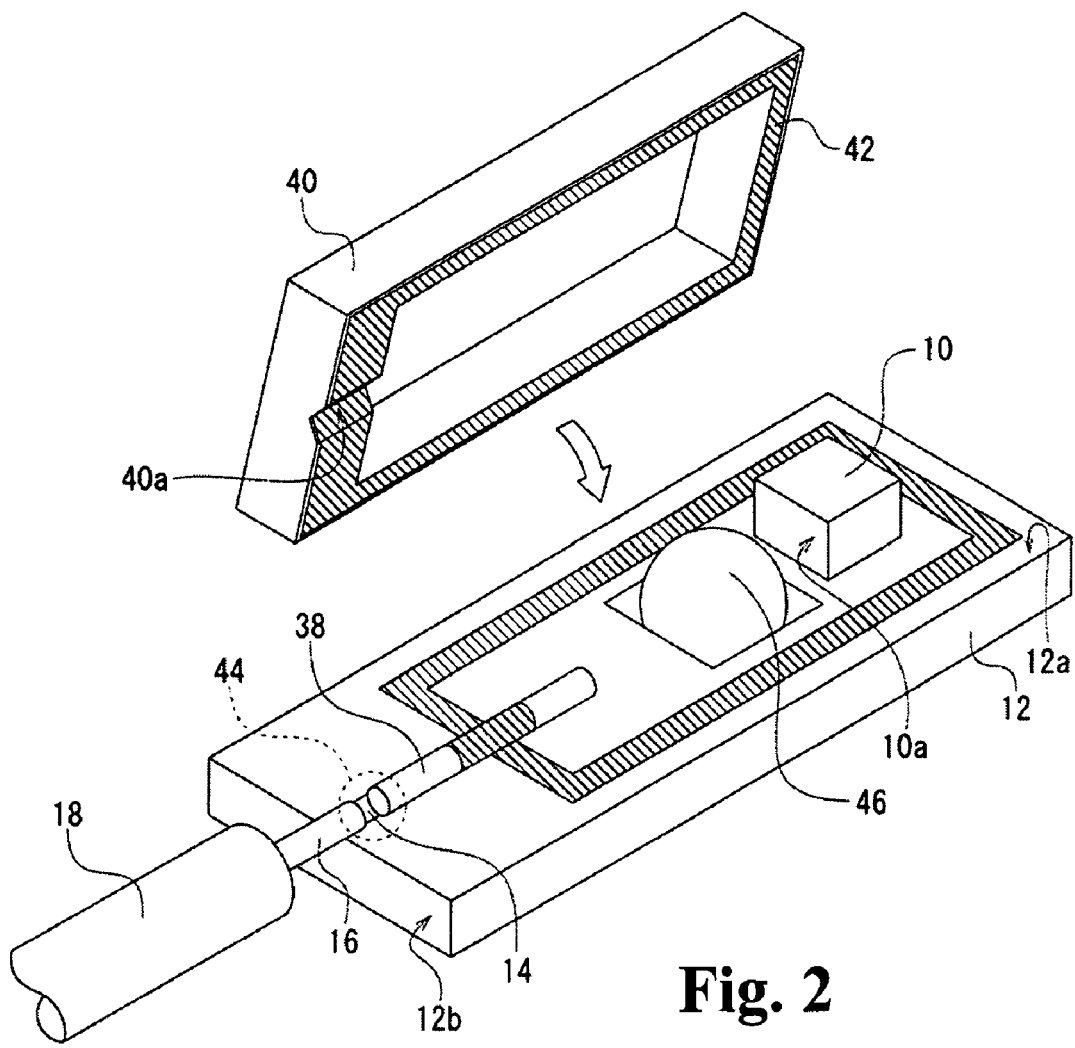
FIG. 2 is a schematic exploded perspective view showing a surface mount optical coupler having a short bare fiber and a ball lens according to a second embodiment of the present invention.

A second embodiment of the present invention will be explained next. FIG. 2 is a schematic exploded perspective view showing a surface mount optical coupler according to the second embodiment of the present invention.

In the embodiment, the short bare fiber 38 is optically coupled with the optical semiconductor device 10 (laser diode) through a ball lens 46. As shown in FIG. 2, the optical semiconductor device 10 and the ball lens 46 are disposed on the silicon substrate 12, so that the sealing cover 40 air-tightly seals the optical semiconductor device 10 and the ball lens 46.

In the surface mount optical coupler having the optical semiconductor device 10 and the short bare fiber 38 according to the second embodiment, similar to the first embodiment, the short bare fiber 38 is fixed to the silicon substrate 12 with the sealing cover 40 using solder or low melting point glass, so that the interior of the sealing cover 40 is air-tightly sealed. Accordingly, a light signal is received and transmitted through the ball lens 46 and the short bare fiber 38 between the optical semiconductor device 10 and the pigtail bare fiber 16.

In the surface mount optical coupler according to the second embodiment, similar to the first embodiment, the reflective index matching member 44 formed of a transparent silicone resin is filled in the optically coupled portion between the short bare fiber 38 and the pigtail bare fiber 16 for reducing a coupling loss and reflection light.

In the embodiment, the short bare fiber 38 is fixed to the silicon substrate 12 with solder or low melting point glass through the thermal pressing method for air-tightly sealing. Instead of a metal package, it is possible to use a resin package or a non-metal package, thereby reducing cost.

In the embodiment, the short bare fiber 38 is directly and optically coupled with the pigtail bare fiber 16 outside the sealing cover 40. Further, the pigtail bare fiber 16 is supported in the V-shaped groove 14 outside the sealing cover 40. Accordingly, it is possible to reduce negative influence of slight movement or vibration on the air-tightness of the sealing cover 40 fixed to the silicon substrate 12, thereby improving reliability of the optical coupler.

In a conventional optical coupler, when metal is deposited on an optical fiber with a cover cord, metal is locally deposited on a pigtail fiber of the optical fiber. Accordingly, it is difficult to produce the optical fiber in a large quantity, thereby lowering productivity and increasing cost.

Figure 3:
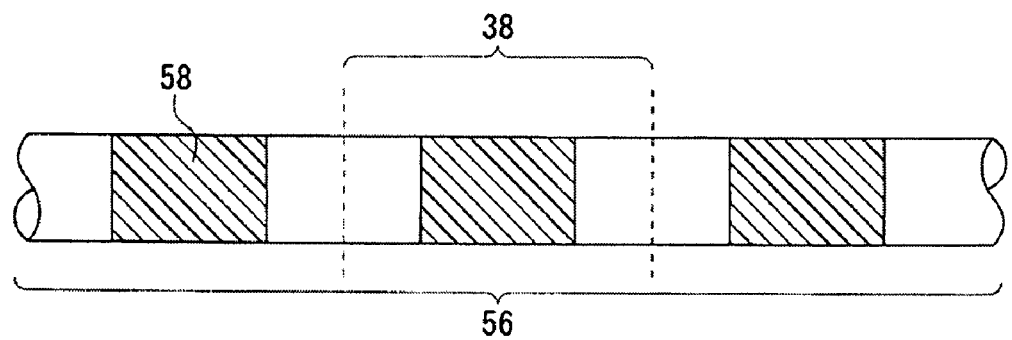
FIG. 3 is schematic plan view showing an example of the short bare fiber with metal deposited thereon according to the present invention.

To this end, metal may de deposited on the short bare fiber 38 with the following process. FIG. 3 is schematic plan view showing an example of the short bare fiber 38 with metal deposited thereon according to the present invention. As shown in FIG. 3, in the process, first, metal 58 is deposited on a long bare fiber 56. Afterward, the long bare fiber 56 is cut into a plurality of the short bare fibers 38. Accordingly, it is possible to simplify the deposition process and increase production capacity, thereby reducing cost.

In the embodiment, the short bare fiber 38 is formed of vitreous silica having a high melting point. Accordingly, the short bare fiber 38 has sufficient heat resistance relative to a reflow temperature. Further, it is possible to stably place the silicon substrate 12 in the state that the short bare fiber 38 is disposed in the V-shaped groove 14. Accordingly, it is possible to mount the optical coupler with a reflow process together with other electrical components.

Third Embodiment

Figure 4:
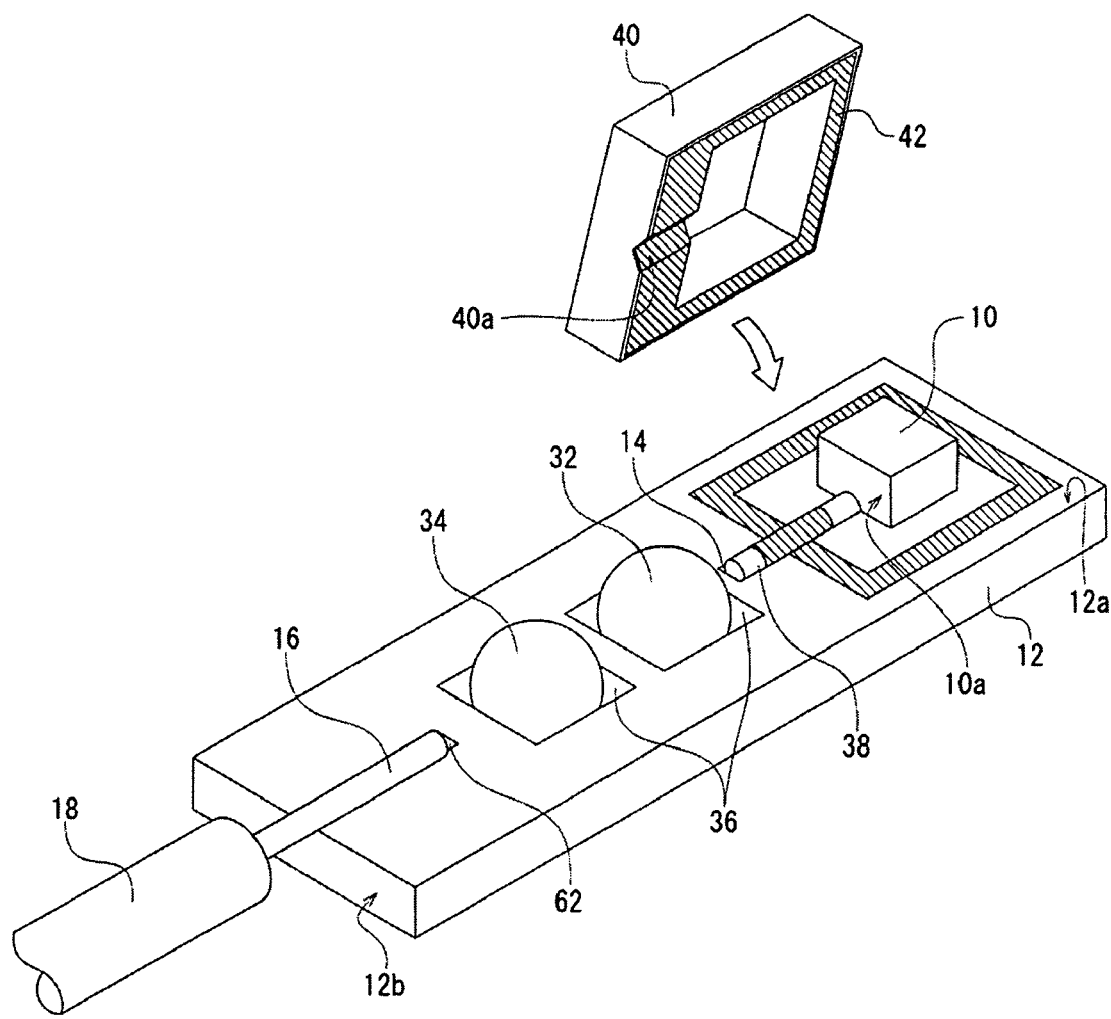
FIG. 4 is a schematic exploded perspective view showing a surface mount optical coupler having a short bare fiber and two ball lenses according to a third embodiment of the present invention.

A third embodiment of the present invention will be explained next. FIG. 4 is a schematic exploded perspective view showing a surface mount optical coupler according to the third embodiment of the present invention. In the embodiment, the surface mount optical coupler is a collimator lens coupling type.

As shown in FIG. 4, in the surface mount optical coupler, the optical semiconductor device 10 mounted on the upper surface 12a of the silicon substrate 12 and the portion of the short bare fiber 38 optically coupled with the optical semiconductor device 10 are air-tightly sealed with the sealing cover 40. Further, the short bare fiber 38 is optically coupled with the pigtail bare fiber 16 outside the sealing cover 40 through a collimator lens 32 and a collective lens 34.

In the embodiment, the collimator lens 32 and the collective lens 34 are mounted in V-shaped grooves 36 without an axis adjusting process. The pigtail bare fiber 16 is disposed in a V-shaped groove 62 formed in the upper surface 12a of the silicon substrate 12. The V-shaped groove 62 extends linearly on an extension of the V-shaped groove 14.

In the embodiment, the short bare fiber 38 has a spot size of light same as that of the pigtail bare fiber 16, and is optically coupled with the pigtail bare fiber 16 through the collimator lens system. That is, the short bare fiber 38 mounted in the V-shaped groove 14 is optically coupled with the optical semiconductor device 10 (laser diode) mounted on the upper surface 12a of the silicon substrate 12 without an axis adjusting process. Further, the short bare fiber 38 is optically coupled with the pigtail bare fiber 16 through the collimator lens 32 and the collective lens 34 mounted in the V-shaped grooves 36.

In the embodiment, the fibers having an equivalent mode are coupled through the lenses, thereby improving coupling efficiency and alleviating mounting tolerance.

Figure 5:
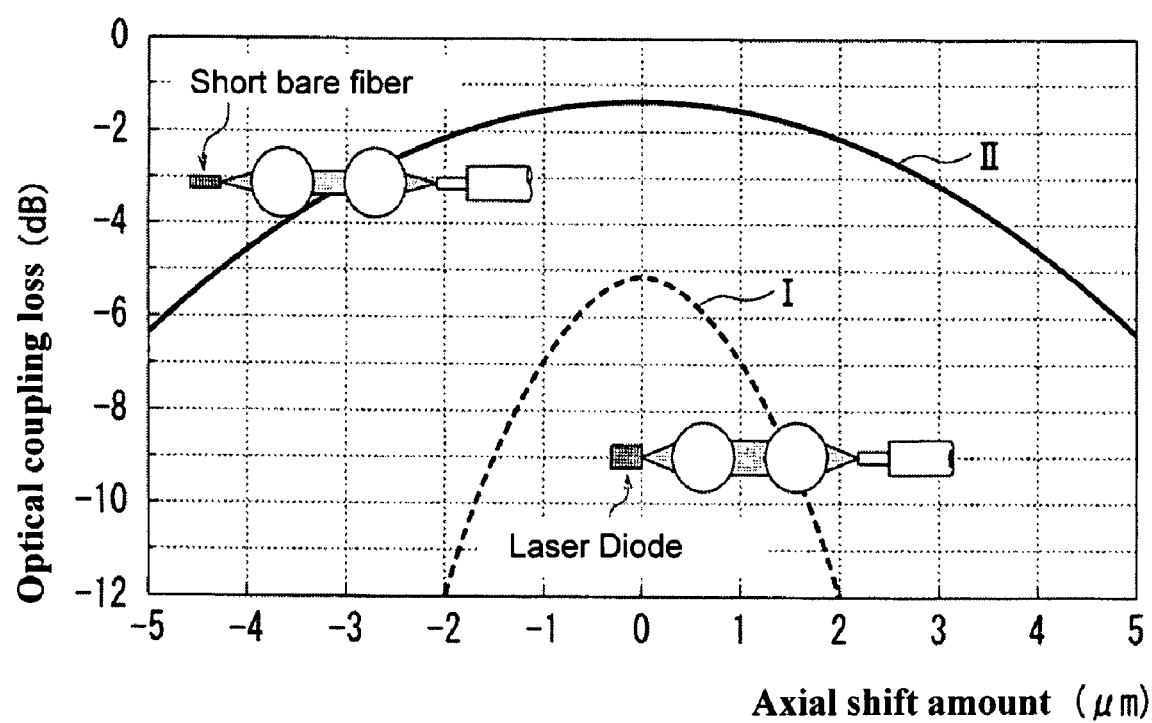
FIG. 5 is a graph showing a relationship between an optical coupling loss and an axial shift amount.

FIG. 5 is a graph showing a relationship between an optical coupling loss and an axial shift amount. In FIG. 5, a tolerance characteristic of the optical coupling loss is simulated in the collimator lens coupling between the optical semiconductor device 10 and the pigtail bare fiber 16, and the collimator lens coupling between the short bare fiber 38 and the pigtail bare fiber 16.

In the simulation, a laser frequency is 1310 nm. In the collimator lens coupling between the optical semiconductor device 10 and the pigtail bare fiber 16, the optical semiconductor device 10 or the laser diode has a mode diameter of 2 μm in a single mode; the collimator lens 32 is a ball lens formed of $TaF_3$ and having a diameter of 0.6 mm; the collective lens 34 is a ball lens formed of BK7 and having a diameter of 1.0 mm; and the pigtail bare fiber 16 has a mode diameter of 10 μm in a single mode.

In the collimator lens coupling between the short bare fiber 38 and the pigtail bare fiber 16, the short bare fiber 38 has a mode diameter of 10 μm in a single mode; the collimator lens 32 and the collective lens 34 are ball lenses formed of BK7 and having a diameter of 1.0 mm; and the pigtail bare fiber 16 has a mode diameter of 10 μm in a single mode.

In FIG. 5, a horizontal axis represents the axial shift amount (μm) of the optical semiconductor device 10 or the short bare fiber 38 in a lateral direction, and a vertical axis represents the optical coupling loss (dB). A hidden line I represents the relationship in the collimator lens coupling between the optical semiconductor device 10 and the pigtail bare fiber 16. A solid line II represents the relationship in the collimator lens coupling between the short bare fiber 38 and the pigtail bare fiber 16.

As shown in FIG. 5, in the collimator lens coupling between the optical semiconductor device 10 and the pigtail bare fiber 16, when the axial shift amount is zero, the optical coupling loss is about −5.0 db. Further, when the axial shift amount is ±2.0 μm, the optical coupling loss is about −12.0 db, respectively. In the collimator lens coupling between the short bare fiber 38 and the pigtail bare fiber 16, when the axial shift amount is zero, the optical coupling loss is about −1.5 db. Further, when the axial shift amount is ±5.0 μm, the optical coupling loss is about −6.3 db, respectively.

In comparison between the hidden line I and the solid line II, in the collimator lens coupling between the optical semiconductor device 10 and the pigtail bare fiber 16, the coupling loss is relatively large due to the mode mismatch, and the mounting tolerance is severe with respect to the shift of the optical semiconductor device 10. Accordingly, the mounting with an axial adjusting process is necessary.

On the other hand, in the collimator lens coupling between the short bare fiber 38 and the pigtail bare fiber 16, the optical coupling loss and the mounting tolerance are significantly improved due to the same mode of the short bare fiber 38 and the pigtail bare fiber 16. Accordingly, it is possible to mount without an axial adjusting process.

Fourth Embodiment

Figure 6A:
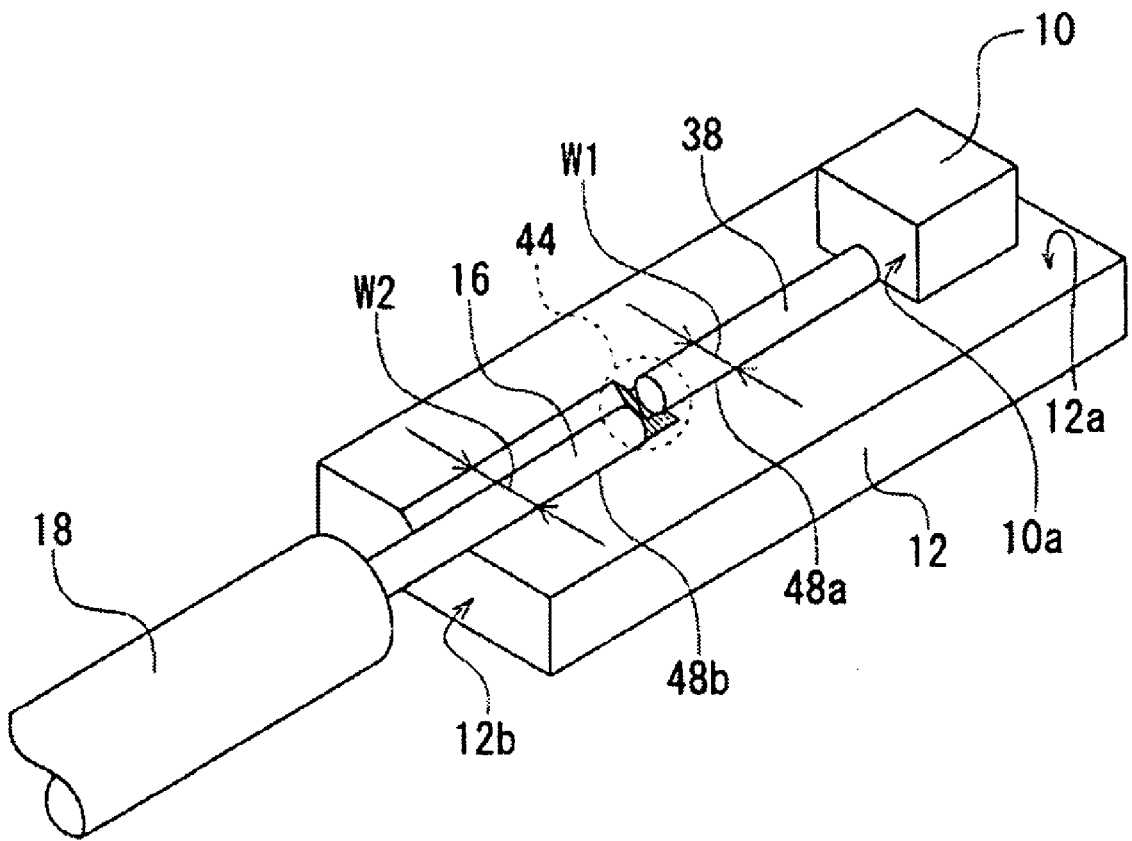
FIG. 6(A) is a schematic perspective view showing a surface mount optical coupler having a short bare fiber according to a fourth embodiment of the present invention.
Figure 6B:
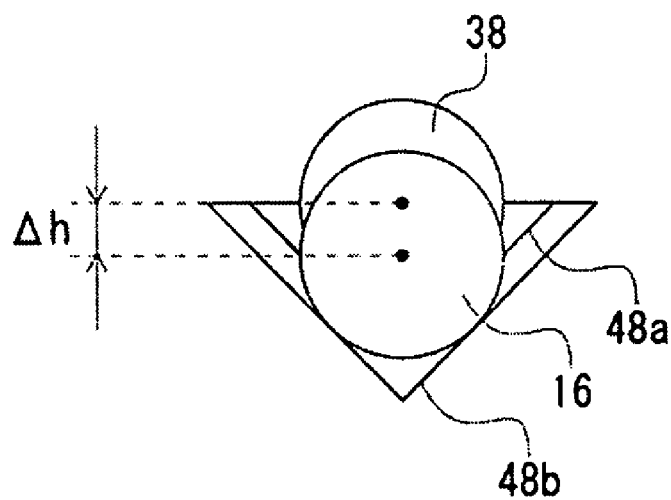
FIG. 6(B) is a view showing an off-set state of an optical fiber.

With reference to FIGS. 6(A) and 6(B), a fourth embodiment of the present invention will be explained. FIG. 6(A) is a schematic perspective view showing a surface mount optical coupler according to the fourth embodiment of the present invention, and FIG. 6(B) is a view showing an off-set state of two optical fibers for patch connection.

As shown in FIG. 6(A), the surface mount optical coupler includes the silicon substrate 12; the optical semiconductor device 10 disposed on the upper surface 12a of the silicon substrate 12; the short bare fiber 38 with a single mode disposed in a front V-shaped groove 48a; and the pigtail bare fiber 16 with a multi mode disposed in a rear V-shaped groove 48b.

In the embodiment, the short bare fiber 38 is optically coupled with the pigtail bare fiber 16 in a state that the end surface thereof closely faces that of the short bare fiber 38. The reflective index matching member 44 formed of a transparent silicone resin is filled in the optically coupled portion between the short bare fiber 38 and the pigtail bare fiber 16 for reducing a coupling loss and reflection light.

When two optical fibers are optically coupled in a state that optical axes thereof are shifted, such optical connection is called patch cord connection. In the embodiment, the short bare fiber 38 with a single mode functions as a patch cord relative to the pigtail bare fiber 16 with a multi mode.

When the short bare fiber 38 has a diameter same as that of the pigtail bare fiber 16, the front V-shaped groove 48a is configured to have a width W1 same as a width W2 of the rear V-shaped groove 48b (W1=W2), so that a fiber core of the short bare fiber 38 matches to that of the pigtail bare fiber 16 (Δh=0). In this case, it is possible to exactly irradiate light from the short bare fiber 38 with a single mode to the fiber core of the pigtail bare fiber 16 with a multi mode.

On the other hand, the short bare fiber 38 has a diameter different from that of the pigtail bare fiber 16, the front V-shaped groove 48a is configured to have a width W1 different from a width W2 of the rear V-shaped groove 48b (W1≠W2), so that the fiber core of the short bare fiber 38 is shifted from that of the pigtail bare fiber 16 (Δh≠0). Accordingly, it is possible to exactly irradiate light from the short bare fiber 38 with a single mode to the fiber core of the pigtail bare fiber 16 with a multi mode.

Figure 7:
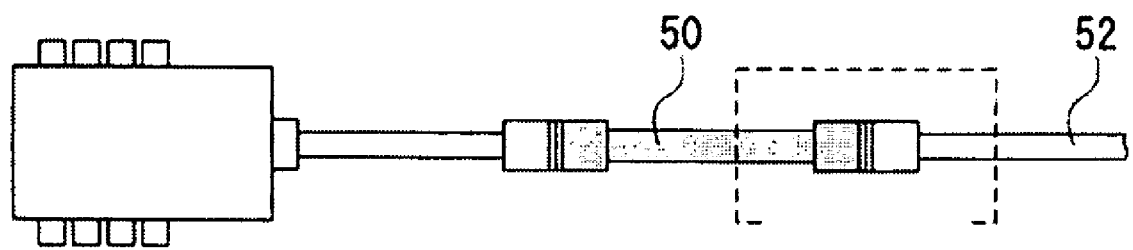
FIG. 7 is a schematic view showing an example of a conventional patch cord fiber in a connected state.

With reference to FIG. 7, a conventional patch connection will be compared with the patch connection according to the embodiment of the present invention. FIG. 7 is a schematic view showing an example of the conventional patch connection, in which a conventional patch cord fiber 50 with a single mode is connected to a conventional multi mode fiber 52.

In the example, a fiber core of the conventional patch cord fiber 50 is shifted from a center thereof, so that an optical axis is offset relative to a fiber core of the conventional multi mode fiber 52 upon connection. Accordingly, light of a single mode from the conventional patch cord fiber 50 enters a specific position of the conventional multi mode fiber 52, thereby reducing mode delay and jitter, and extending a transmission length of the conventional multi mode fiber 52.

In the conventional patch connection, it is difficult to accurately irradiate single mode light emitted from a laser diode or a transmission device directly to a fiber core or a specific position of a multi mode fiber through an axis adjusting process or image recognition. Accordingly, it is necessary to dispose a patch cord fiber between a transmission device and a multi mode fiber, thereby increasing cost and a mounting space.

In the embodiment of the present invention, as described above, the short bare fiber 38 is disposed as the patch cord between the optical semiconductor device 10 and the pigtail bare fiber 16. Then, through adjusting the widths W1 and W2 of the front V-shaped groove 48a and the rear V-shaped groove 48b, it is possible to accurately and easily irradiate single mode light to the specific position of the pigtail bare fiber 16. Accordingly, it is possible to extend a transmission length without the conventional patch cord fiber, thereby reducing cost and a space.

Fifth Embodiment

Figure 8:
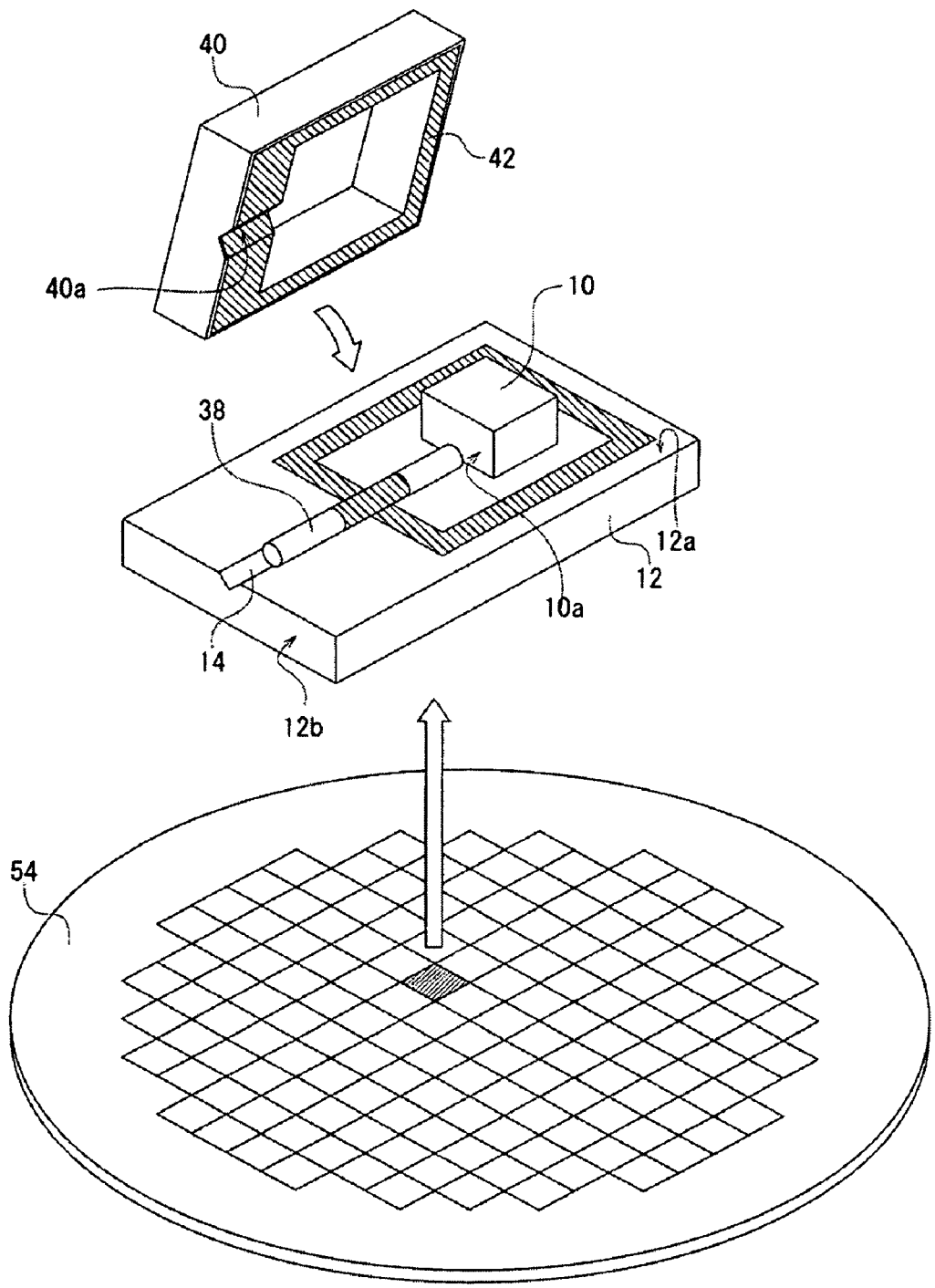
FIG. 8 is a schematic view showing a method of producing the surface mount optical coupler according to a fifth embodiment of the present invention.
Figure 9A:
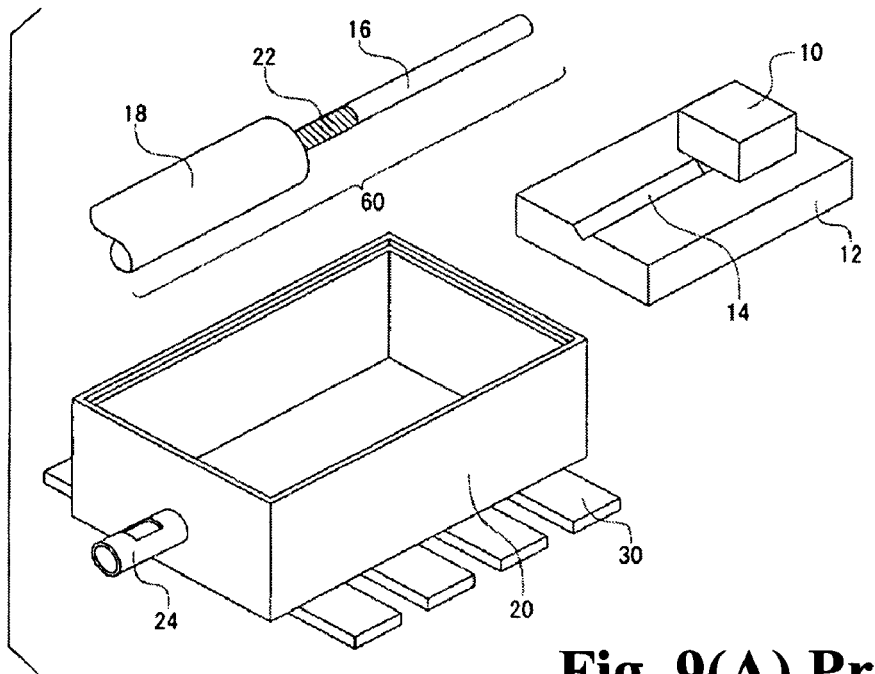
FIG. 9(A) is a schematic view showing a conventional surface mount optical coupler.
Figure 9B:
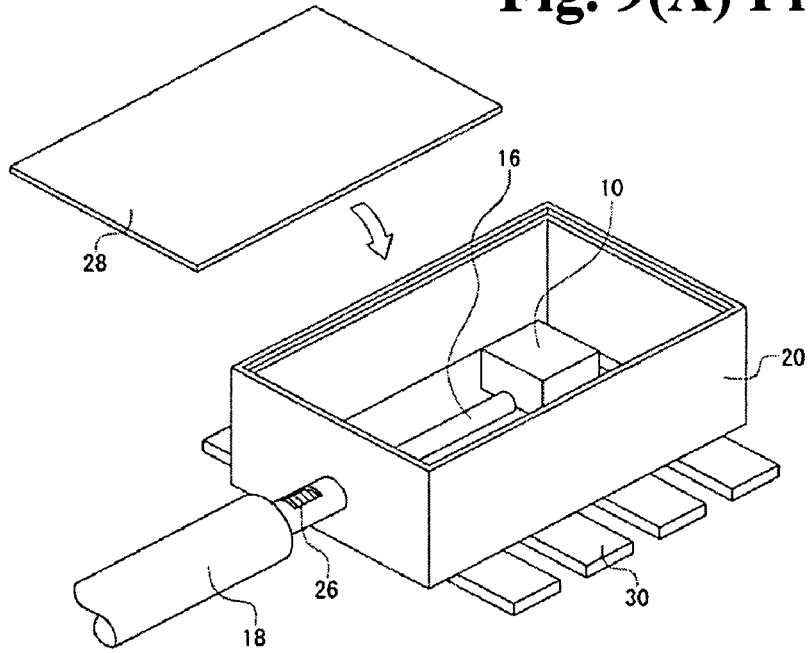
FIG. 9(B) is a schematic view showing an assembly process of the conventional surface mount optical coupler.
Figure 10:
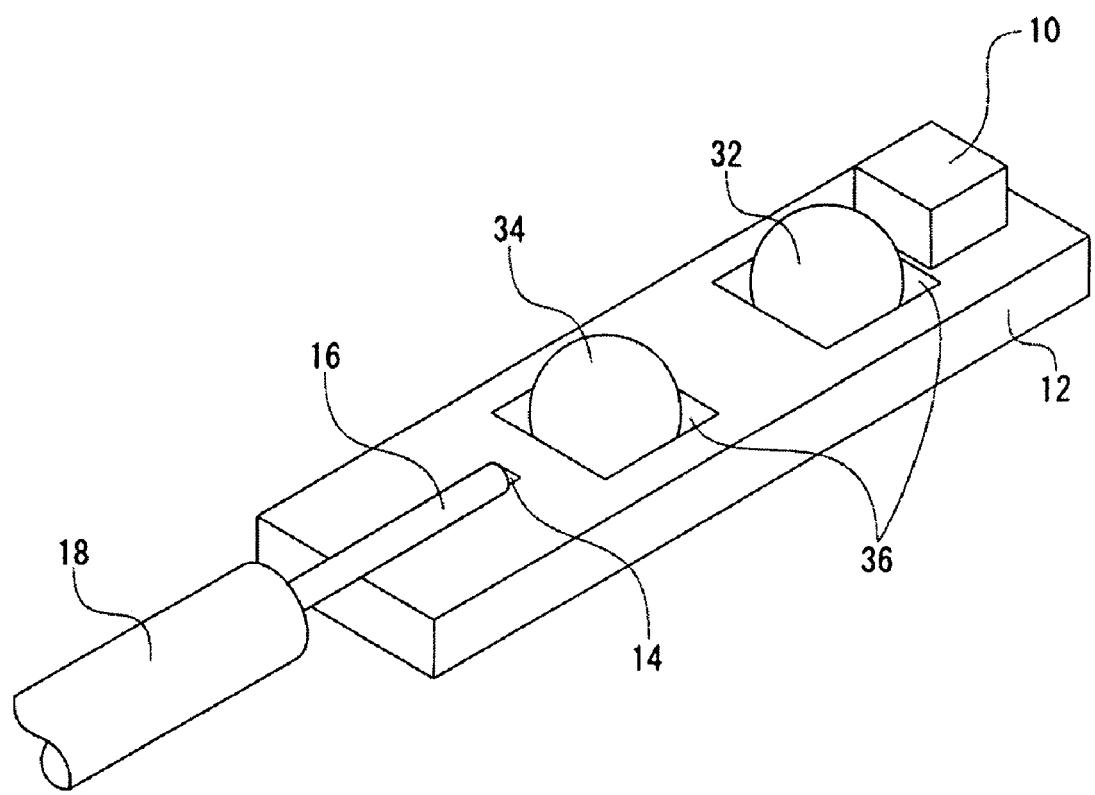
FIG. 10 is a schematic perspective view showing another conventional surface mount optical coupler.

With reference to FIG. 8, a fifth embodiment of the present invention will be explained. FIG. 8 is a schematic view showing a method of producing the surface mount optical coupler according to the fifth embodiment of the present invention.

As shown in FIG. 8, a plurality of silicon substrates 12 is defined on a silicon wafer 54. In the method, after the optical semiconductor device 10, the short bare fiber 38 and the sealing cover 40 are mounted on each of the silicon substrates 12, the silicon wafer 54 is cut into pieces to individually form the surface mount optical couplers.

In the method, first, the V-shaped groove 14 is formed in the upper surface of the silicon substrate 12 through photolithography and alkali etching, so that the V-shaped groove 14 extends from one side of an area of the silicon wafer 54 to be cut into pieces to a middle of the area. Then, the optical semiconductor device 10 is mounted on the upper surface of the silicon substrate 12 on the extension of the V-shaped groove 14, so that the light emitting surface thereof becomes perpendicular to the direction that the V-shaped groove 14 extends.

In the next step, the short bare fiber 38 having a length smaller than that of the V-shaped groove 14 is placed in the V-shaped groove 14, so that the one end surface of the short bare fiber 38 is optically coupled with the light emitting surface of the optical semiconductor device 10. Then, the short bare fiber 38 and the optical semiconductor device 10 are air-tightly sealed with the sealing cover 40.

As described above, in the embodiment, the optical semiconductor device 10 and the short bare fiber 38 are sequentially mounted on the silicon substrate 12 constituting the silicon wafer 54, and then the sealing cover 40 air-tightly seals the short bare fiber 38 and the optical semiconductor device 10. Accordingly, it is possible to perform a series of the mounting process on the silicon wafer 54. After all of the components are mounted, the silicon wafer 54 is cut through a dicing cut process to obtain the surface mount optical couplers individually.

As described above, in the embodiment, it is possible to perform a series of the mounting process on the silicon wafer 54. Accordingly, it is possible to simplify and reduce the production process or enable an automated process, thereby reducing manufacturing cost and maintaining stable quality.

The disclosure of Japanese Patent Application No. 2006-131755, filed on May 10, 2006, is incorporated in the application.

While the invention has been explained with reference to the specific embodiments of the invention, the explanation is illustrative and the invention is limited only by the appended claims.

What is claimed is:

1. A surface mount optical coupler, comprising:
a silicon substrate having a first groove, said first groove extending in a first direction;
an optical semiconductor device disposed on the silicon substrate, said optical semiconductor device having at least one of a light emitting surface and a light receiving surface arranged perpendicular to the first direction;
a bare fiber disposed in the groove, said bare fiber having one end surface optically coupled with the at least one of the light emitting surface and the light receiving surface;
a seal cover for sealing the optical semiconductor device and the bare fiber; and a pigtail bare fiber disposed in the groove, said pigtail bare fiber being optically coupled with the other end surface of the bare fiber, said pigtail bare fiber being disposed outside the seal cover.

2. The surface mount optical coupler according to claim 1, wherein said bare fiber has a length smaller than that of the first groove.

3. The surface mount optical coupler according to claim 1, wherein said bare fiber is formed of vitreous silica.

4. The surface mount optical coupler according to claim 1, wherein said bare fiber is fixed to the groove with solder or low melting point glass.

5. The surface mount optical coupler according to claim 1, further comprising a ball lens disposed in a second groove formed in the silicon substrate.

6. The surface mount optical coupler according to claim 5, wherein said ball lens is disposed between the optical semiconductor device and the bare fiber so that the bare fiber is optically coupled with the semiconductor device through the ball lens.

7. The surface mount optical coupler according to claim 5, wherein said ball lens is disposed between the bare fiber and a pigtail bare fiber so that the bare fiber is optically coupled with the pigtail bare fiber through the ball lens.

8. A method of mounting a surface mount optical coupler, comprising the steps of:
preparing the surface mount optical coupler according to claim 1; and
mounting the surface mount optical coupler on a electric circuit board through a reflow process.

9. A surface mount optical coupler, comprising:
a silicon substrate having a first groove, said first groove extending in a first direction;
an optical semiconductor device disposed on the silicon substrate, said optical semiconductor device having at least one of a light emitting surface and a light receiving surface arranged perpendicular to the first direction;
a bare fiber disposed in the groove, said bare fiber having one end surface optically coupled with the at least one of the light emitting surface and the light receiving surface; and
a pigtail bare fiber disposed in a second groove formed in the silicon substrate, said second groove having a depth different from that of the first groove such that an optical axis of the bare fiber is shifted from that of the pigtail bare fiber.

10. The surface mount optical coupler according to claim 9, wherein said bare fiber has a length smaller than that of the first groove.

11. The surface mount optical coupler according to claim 9, wherein said bare fiber is formed of vitreous silica.

12. The surface mount optical coupler according to claim 9, wherein said bare fiber is fixed to the groove with solder or low melting point glass.

13. The surface mount optical coupler according to claim 9, further comprising a ball lens disposed in a second groove formed in the silicon substrate.

14. The surface mount optical coupler according to claim 13, wherein said ball lens is disposed between the optical semiconductor device and the bare fiber so that the bare fiber is optically coupled with the semiconductor device through the ball lens.

15. The surface mount optical coupler according to claim 13, wherein said ball lens is disposed between the bare fiber and a pigtail bare fiber so that the bare fiber is optically coupled with the pigtail bare fiber through the ball lens.

16. A method of producing a surface mount optical coupler, comprising the steps of:
forming a first groove in a silicon substrate;
mounting an optical semiconductor device on the silicon substrate on an extension of the first groove such that a light emitting surface of the optical semiconductor device is aligned in a direction perpendicular to a direction that the first groove extends;
placing a bare fiber having a length smaller than that of the first groove in the first groove such that one end surface of the bare fiber is optically coupled with the light emitting surface of the optical semiconductor device;
sealing the optical semiconductor device and the short bare fiber with a sealing cover; and
disposing a pigtail bare fiber on the silicon substrate outside the seal cover.

17. The method of producing a surface mount optical coupler according to claim 16, further comprising the step of disposing a ball lens on the silicon substrate.

18. A method of producing a surface mount optical coupler, comprising the steps of:
forming a first groove in a silicon substrate;
mounting an optical semiconductor device on the silicon substrate on an extension of the first groove such that a light emitting surface of the optical semiconductor device is aligned in a direction perpendicular to a direction that the first groove extends;
placing a bare fiber having a length smaller than that of the first groove in the first groove such that one end surface of the bare fiber is optically coupled with the light emitting surface of the optical semiconductor device;
sealing the optical semiconductor device and the short bare fiber with a sealing cover;
disposing a pigtail bare fiber on the silicon substrate; and
forming a second groove in the silicone substrate, said second groove having a depth different from that of the first groove such that an optical axis of the bare fiber is shifted from that of the pigtail bare fiber.

19. The method of producing a surface mount optical coupler according to claim 18, further comprising the step of disposing a ball lens on the silicon substrate.

* * * * *